INVENTORS: C. F. MATTKE
L. W. MOSING

BY John C. Morris

ATTORNEY

Jan. 15, 1963 C. F. MATTKE ETAL 3,073,911

TELEPHONE SET

Filed May 11, 1960 2 Sheets-Sheet 2

INVENTORS: C. F. MATTKE
L. W. MOSING

BY John C. Morris

ATTORNEY 3,073,911
TELEPHONE SET

Charles F. Mattke, Fanwood, and Lionel W. Mosing, Springfield, N.J., assignors to Bell Telephone Laboratories, Incorporated, New York, N.Y., a corporation of New York Filed May 11, 1960, Ser. No. 28,410
8 Claims. (Cl. 179—100)

This invention relates to substation apparatus and more particularly to a universal telephone set that can be used on either a horizontal surface, such as a desk, or on a vertical surface, such as a wall.

One of the problems encountered in designing a universal telephone set is how to support the handset on the base. It is desirable that the handset rest on the base in the same position no matter whether the base is horizontal or vertical. However, in almost all telephone sets, the weight of the handset is the force that is used to maintain it on the base, and, of course, as the base shifts in position from horizontal to vertical, the direction in which this force acts also changes. Therefore the type of handset support that operates best in one position may not be needed or may actually interfere with the use of the handset in the other position.

An object of this invention is to provide a universal telephone set incorporating a novel handset support.

This and other objects of the invention are achieved in an illustrative embodiment thereof wherein the telephone set comprises a handset having a particular external form and a base adapted to receive the handset, the base having an external form complementary to that of the handset. Switching means are housed within the base and spaced movable members for operating the switching means protrude from the base, the movable members being operated by the placement of the handset on and the removal of the handset from the base. A support is juxtaposed between the plungers, and it is alternatively positionable so as to protrude from or lie within the base. When the telephone set is used on a horizontal surface, the particular configuration of the base is sufficient by itself to hold the handset thereon and the support is positioned within the base so as not to interfere with the use of the handset. When the telephone set is used on a vertical surface, the configuration of the base is insufficient to hold the handset thereon, and the support is positioned so as to protrude from the base. The handset has a cavity therein for accommodating the protruding support, and when the handset is positioned on the base, the support extends into the cavity to hold the handset on the base.

A feature of this invention resides in the base having an auxiliary support for the handset whereby when the base is mounted on a vertical surface, the handset may be held on the base without operating the contact plungers.

A complete understanding of the invention and of this and other features and advantages thereof may be gained from consideration of the following detailed description taken in conjunction with the accompanying drawing wherein one embodiment of the invention is illustrated. It is to be expressly understood, however, that the drawing is for the purposes of illustration and description and is not to be construed as defining the limits of the invention.

Figure 1:
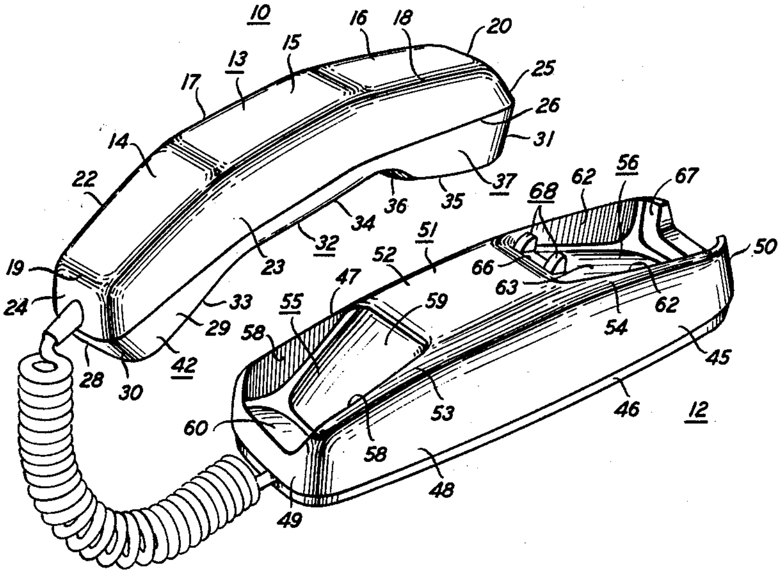
FIG. 1 is a perspective view of the telephone set of this invention positioned for use on a horizontal surface.

Referring now to the drawings, and in particular to FIG. 1, the telephone set of this invention comprises a handset 10 and a base 12, both having a rectilinear appearance. A top surface 13 of the handset consists of three flat surfaces 14, 15, and 16, the surfaces 14 and 16 being downwardly divergent from the surface 15. The surfaces are blended at their junctions and closely approximate a gentle curve. The surface 15 is rectangular, while the surfaces 14 and 16 have the shape of truncated triangles, and longitudinal edges 17 and 18 of the top surface, therefore, aproximate a pair of parentheses in that they are parallel at their center and converge at their ends. Transverse edges 19 and 20 of the top surface are parallel.

Sides 22 and 23 extend downwardly and divergently from the longitudinal edges 17 and 18, respectively, and ends 24 and 25 extend downwardly and divergently from the transverse edges 19 and 20, respectively. At a division line 26 the slope of the surfaces reverses, forming downwardly converging sides 28 and 29 and ends 30 and 31. A bottom surface 32 of the handset somewhat duplicates the line of the top surface 13 by having surfaces 33, 34, and 35 that are approximately parallel to the surfaces 14, 15, and 16. However, the surfaces 34 and 35 are joined together by a fourth surface 36.

The large number of approximately planar surfaces of the handset provide it with four stable positions in which it will remain when placed on a horizontal surface. A first position is resting top side up, in the manner shown in FIG. 1, on the bottom edges of the ends 30 and 31. A second position is lying on either of the opposing sides 28 and 29. A third position is lying on either of the opposing sides 22 and 23, and a fourth position is resting bottom side up on the surface 15.

Figure 3:
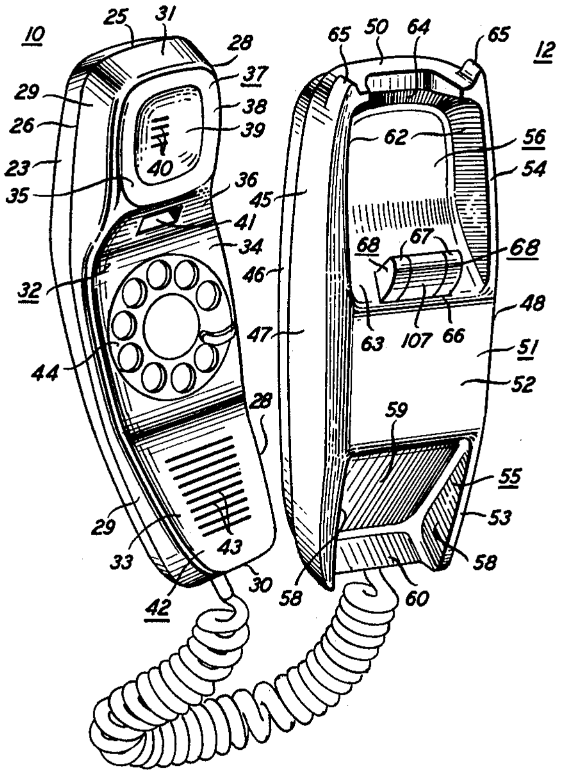
FIG. 3 is a perspective view of the telephone set of this invention positioned for use on a vertical surface.

Turning now to FIG. 3, the bottom surface 32 of the handset 10 includes a quadrangular earpiece 37 that is defined by the end 31, the upper portion of the sides 28 and 29, and the surfaces 35 and 36, the surface 35 consisting of a quadrangular ring 38 that circumscribes a dished portion 39. Linear slots 40 are formed in the dished portion and overlie a telephone receiver mounted within the handset. The surface 36 has a rectangular cavity or orifice 41 which is used to support the handset 10 on the base 12 in a manner hereinafter described. At the other end of the handset a quadrangular mouthpiece 42 is defined by the lower portion of the sides 28 and 29, the end 30, and the surface 33. Linear slots 43 in the surface 33 overlie a telephone transmitter housed within the handset. Intermediate the earpiece and mouthpiece, a call transmitter 44 is mounted in a depression in the surface 34, and the top of the transmitter is substantially flush with this surface.

The quadrangular shape of the earpiece 37 has a decided advantage over the standard circular shape used in nearly all handsets. The circular earpiece feels the same on the ear no matter where the mouthpiece is in relation to the user's mouth, and therefore the user is frequently unaware that he is not speaking directly into the mouthpiece until the party with whom he is conversing asks him to speak louder. The quadrangular shape, on the other hand, serves to key the handset to the user's ear. It does this because it feels comfortable on the ear when the handset is held so that the mouthpiece is in juxtaposition with the user's mouth, but feels uncomfortable when the mouthpiece is in juxtaposition with the user's chin or jaw. The former position is, of course, the manner in which the handset should be held as then the user is speaking directly into the mouthpiece, and the quadrangular shape encourages the user to hold the handset in this position.

The circular earpiece, furthermore, provides an excellent bearing on which the handset can be rotated without the user being aware of the movement. Therefore, even if the user initially places the handset to his ear in the proper position, in the course of transmitting the call or during the ensuing conversation he will often unconsciously move the handset to a position where the mouthpiece is no longer in juxtaposition with his mouth. The quadrangular shape, on the other hand, is uncomfortable to rotate on the ear, and so the user is made aware of movement of the handset. Thus the quadrangularly shaped earpiece 37 aids the user in maintaining the handset properly positioned on his head.

Referring again to FIG. 1, the base 12 of the telephone set comprises a shell 45 secured to a bottom plate 46. Side walls 47 and 48, and end walls 49 and 50 of the shell extend in an approximately vertical direction from the plate, the side walls merging with a top surface 51 that extends approximately parallel to the plate at its middle 52 and slopes downwardly toward the plate at its ends 53 and 54 to duplicate the appearance of the top surface 13 of the handset 10.

The ends 53 and 54 of the top surface 51 are provided with wells 55 and 56 that are shaped to, respectively, accommodate the mouthpiece 42 and the earpiece 37 of the handset. The well 55 comprises downwardly converging sides 58, a bottom surface 59 that slopes down from the middle surface 52 toward the end wall 49, and an end surface 60 that slopes down from the end wall 49 and intersects with the bottom surface 59, the end wall being of a lesser height than the side walls 47 and 48. The well 56 comprises downwardly converging sides 62, a bottom surface 63 that, as shown most clearly in FIG. 3, slopes downward from the middle surface 52 toward the end wall 50 at a high angle of incline initially and then bends to a lower angle of incline, and an end surface 64 that slopes sharply downward from the end wall 50 and intersects the bottom surface 63. The end wall 50 is U-shaped, the legs of the U rising to the height of the side walls 47 and 48 and, therefore, the end surface 64 of the well 56 is also U-shaped.

The shape of the wells 55 and 56 accomplishes three functions. First, the wells 55 and 56 conform to the shape of the mouthpiece 42 and earpiece 37, respectively, so that when the handset is positioned on the base, the telephone set has the appearance of an integrated unit. Second, the surfaces of the wells aid in the seating of the handset on the base. The engagement of the downwardly converging surfaces of the opposing sides 28 and 29 of the handset with the downwardly converging sides 58 and 62 of the wells centers the handset between the sides, and the engagement of the downwardly diverging surfaces 33, 36, and 35 of the bottom surface 32 of the handset with the downwardly diverging bottom surfaces 59 and 63 of the wells causes the handset to slide along its longitudinal axis into a proper rest position, the upwardly divergent end surfaces 60 and 64 of the wells acting to prevent the handset from sliding off the base.

The third function of the wells 55 and 56 is to provide line-to-line rather than surface-to-surface contact between the handset 10 and the base 12 when the handset is in a rest position, thereby reducing abrasion between the handset and base to a minimum. This is accomplished by having the middle surface 52 of the base slightly longer than the surface 34 of the handset, and by having the angle that the sides 58 and 62 of the wells make with the horizontal slightly less than the angle of the sides 28 and 29 of the handset, and the angle that the bottom surfaces 59 and 63 of the wells make with the horizontal, respectively, slightly greater than the angle of the surface 33 and the surfaces 35 and 36 of the bottom surface 32 of the handset. Thus the ends of the surfaces 33 and 36 adjacent to the surface 34 in the handset rest on the bends in the base formed at the junction between the middle surface 52 and the bottom surfaces 59 and 63 of the wells, spacing the handset surface 34 a small amount above the middle surface 52 of the base.

Figure 2:
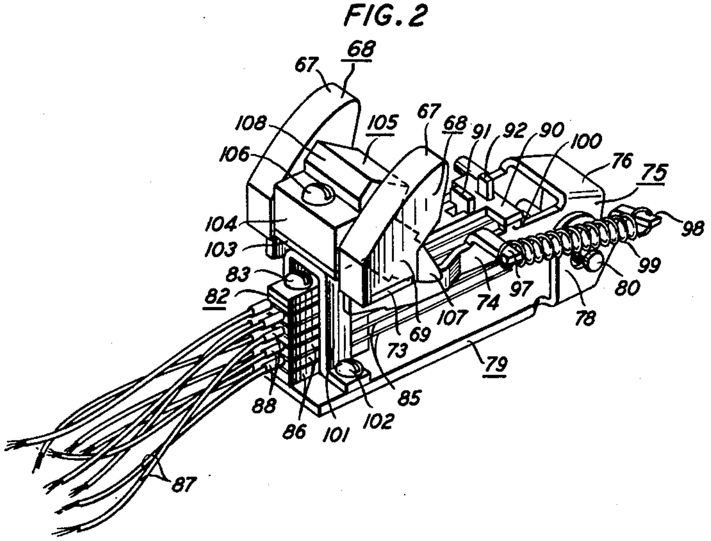
FIG. 2 is an enlarged perspective view of the switching means, the movable members, and the support as they would be oriented in the telephone set of FIG. 1.
Figure 4:
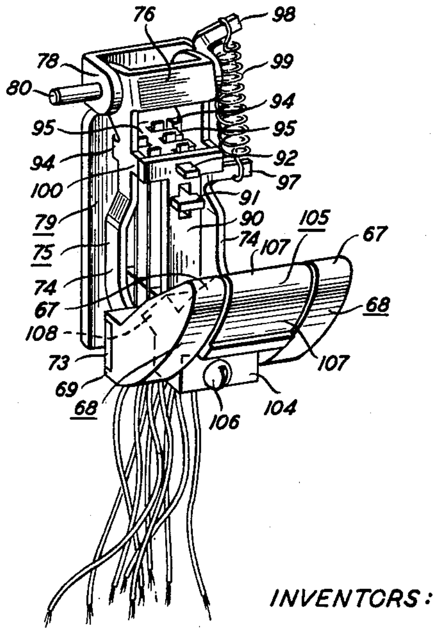
FIG. 4 is an enlarged perspective view of the switching means, the movable members, and the support as they would be oriented in the telephone set of FIG. 3.

As shown in FIG. 3, the shell 45 has horns or projections 65 that extend from the end wall 50. The horns provide an auxiliary support for the handset in a manner hereinafter described. The shell 45 also has an opening 66 in the portion of the bottom surface 63 adjacent to the middle surface 52 and cam portions 67 of spaced plungers 68 protrude through the opening. As illustrated in FIGS. 2 and 4, the cam portions 67 of the plungers extend at about a 45 degree angle from pedestal portions 69, and the pedestal portions are mounted on tabs 73 extending divergently from the ends of arms 74 of a movable bracket 75, the arms being joined by a yoke 76. The portions of the arms adjacent to the yoke are positioned between upstanding arms 78 of a stationary bracket 79, and a pin 80 extending through the arms of both brackets pivotally secures the movable bracket to the stationary bracket.

Referring to FIG. 2, a contact spring pile-up 82 is secured to the stationary bracket 79 by means of a pair of screws 83, only one of which is shown. The spring pile-up includes a plurality of contact springs 85 insulated from each other by insulators 86 and connected to appropriate leads 87 by means of terminal lugs 88. A T-shaped stop 90 is superimposed upon the pile-up, and a fixed card 91 and movable card 92 are mounted in the stop. In the manner disclosed in Patent 2,566,840 issued to Charles L. Krumreich on September 4, 1951, the fixed card provides stopping surfaces to position and limit the amount of travel of certain of the contact springs, and the movable card operates certain of the contact springs to open and close contacts mounted thereon in a preselected sequence. As seen most clearly in FIG. 4, the arms 74 of the movable bracket 75 have convergently extending fingers 94 which underlie a pair of ears 95 on the movable card. Certain of the contact springs bias the movable card against the fingers 94, and therefore movement of the movable bracket 75 causes movement of the movable card, the card, in turn, operating the contact springs.

The movable bracket 75 and the stationary bracket 79, respectively, have lugs 97 and 98 that extend to the right thereof. The ends of a helical spring 99 are secured to the lugs, and the lugs so position the spring with respect to the pivot pin 80 that the spring acts to rotate the movable bracket away from the stationary bracket. The rotation of the movable bracket, however, is limited by the engagement of fingers 100 of the arms 74 with the T-shaped stop 90.

Turning now to FIG. 2, an inverted U-shaped bracket 101 is positioned between the ends of the arms 74 of the movable bracket 75 and secured to the stationary bracket 79 by a pair of screws 102, only one of which is visible. The bracket has a ledge 103, and a stem 104 of a support 105 is fastened thereto by a screw 106. As shown in FIGS. 2 and 4, the support includes a hook arm 107 and a flush arm 108 that extend from the stem at approximately right angles to each other and at approximately 45 degrees to the stem. The hook arm 107 duplicates the shape of that part of the cam portions 67 of the plungers 68 that extend beyond the surface of the shell 45 when the handset is not positioned thereon. The flush arm 108 is of a shape to extend to the surface of the shell and blend therewith. The stem 104 is alternatively fastenable to the bracket 101 so that one or the other of the arms extends into the opening 66 in the shell.

As depicted in FIGS. 1 and 2, when the telephone set is used on a horizontal surface, the accomodation of the mouthpiece 42 and the earpiece 37 of the handset 10 by the wells 55 and 56 of the base 12 is sufficient by itself to hold the handset on the base. The stem 104 of the support 105 is therefore fastened to the ledge 103 of the bracket 101 so that the flush arm 108 of the support is positioned within the opening 66 in the shell 45. The upper surface of the arm lies flush with the portion of the bottom surface 63 to the left and to the right of the opening, and the arm fills the portion of the opening between the spaced plungers 68.

When the handset 10 is removed from the base 12, the cam portions 67 of the spaced plungers 68 move through the opening 66, the plungers being biased upwardly by the helical spring 99 acting on the movable bracket 75. The upward movement of the movable bracket causes the fingers 94 (FIG. 4) thereof to move the movable card 92 and thereby operate the contact springs 85.

On the return of the handset 10 to the base 12, the portions of the surface 36 of the handset on either side of the cavity 41 (FIG. 3) engage the cam portions 67 of the spaced plungers 68 and depress them, the weight of the handset being greater than the biasing force of the helical spring 99. The downward movement of the movable bracket 75 acting through the movable card 92 results in the reverse operation of the contact springs 85.

As depicted in FIGS. 3 and 4, when the telephone set is used on a vertical surface, the accommodation of the mouthpiece 42 and the earpiece 37 of the handset 10 by the wells 55 and 56 of the base 12 is insufficient to hold the handset on the base. Therefore, the stem 104 of the support 105 is fastened to the ledge 103 (FIG. 2) of the bracket 101 so that the hook arm 107 of the support is positioned within the opening 66 in the shell 45. The hook arm extends beyond the bottom surface 63 of the base, and when the handset is removed from the base, the hook blends with the raised plungers 68. On the return of the handset to the base, the plungers are depressed in the manner described above, and the hook is accommodated by the cavity 41 in the handset. The hook then supports the handset on the base.

If, when the telephone handset is mounted on a vertical surface, it is desirable to support the handset on the base without operating the plungers 68, the handset may be positioned on the base so that either of the horns 65 on the end wall 50 of the base extend into the cavity 41 in the handset. The horns hold the handset along either the side wall 47 or the side wall 48 of the base, and the handset does not engage the plungers 68.

It is to be noted that if the hook arm 107 was to extend through the opening 66 in the shell 45 when the telephone set was being used on a horizontal surface, the accommodation of the hook arm by the cavity 41 in the handset would interfere with the use of the handset. The handset as viewed in FIG. 1 would have to lifted from the base by being moved to the right whereas the natural tendency would be to move the handset to the left as it is being lifted from the base.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A telephone set comprising a handset and a base for receiving the handset, the base having a stationary support for the handset, the support being alternatively positionable so as to protrude from or lie within the base and the handset having an orifice for accommodating the support when it is in its protruding position.

2. A telephone set comprising a handset and a base for receiving the handset, switching means within the base, spaced movable members protruding from the base for operating the switching means upon the removal of the handset from or placement of the handset on the base, a support juxtaposed between the spaced movable members and alternatively positionable so as to protrude from or lie within the base, and an orifice in the handset for accommodating the support when it is in the protruding position.

3. A telephone set as in claim 2 wherein the support includes a portion having the same shape as the protruding portions of the spaced movable members.

4. A telephone set comprising a handset and a base for receiving the handset, switching means within the base, spaced movable members protruding through an opening in the base, the members operating the switching means upon the removal of the handset from or placement of the handset on the base, a support juxtaposed between the members and alternatively positionable so as to protrude through the opening in the base or lie flush with the surface of the base, and an orifice in the handset for accommodating the support when it is in the protruding position.

5. A telephone set comprising a handset and a base for receiving the handset, the base having a first supporting means for holding the handset thereon, switching means within the base, the switching means being operated as a result of the placement of the handset on or the removal of the handset from the first supporting means, a second supporting means for holding the handset on the base, the second supporting means comprising a projection extending from said base remote to said first supporting means, and an orifice in the handset for accommodating said second supporting means.

6. A telephone set as in claim 5 wherein the first supporting means comprises a hook protruding from the base, which hook is accommodatable by the orifice in the handset, and a movable member for operating the switching means protrudes from the base alongside of the hook.

7. A telephone set comprising a handset and a base for receiving the handset, switching means within the base, means protruding from the base for operating the switching means upon the removal of the handset from or the placement of the handset on the base, a support adjacent the switch operating means, the support being alternatively positionable in a first or a second position, the support in the first position protruding from the base and the support in the second position lying within the base, and an orifice in the handset for accommodating the support when it is in the first position.

8. A telephone set as in claim 7 further including an auxiliary handset support remote to the switch operating means, the auxiliary support comprising a projection extending from the base, which projection is accommodatable by the orifice in the handset, whereby when the handset is positioned on the auxiliary support the switch operating means is not actuated.

References Cited in the file of this patent

UNITED STATES PATENTS

| | | |
|---|---|---|
| D. 152,278 | McKenna | Jan. 4, 1949 |
| 1,918,801 | Dilg | July 18, 1933 |
| 2,485,574 | Deakin | Oct. 25, 1949 |
| 2,518,385 | Shann | Aug. 8, 1950 |
| 2,603,719 | Reibe | July 15, 1952 |
| 2,653,192 | Shipton | Sept. 22, 1953 |
| 2,718,563 | Nicholides | Sept. 20, 1955 |
| 2,822,432 | Blomberg et al. | Feb. 4, 1958 |
| 2,933,566 | Muller et al. | Apr. 19, 1960 |
| 2,949,509 | Whidden | Aug. 16, 1960 |